May 29, 1956  R. S. TAYLOR  2,747,814
CORD REEL
Filed Nov. 14, 1952  2 Sheets-Sheet 1
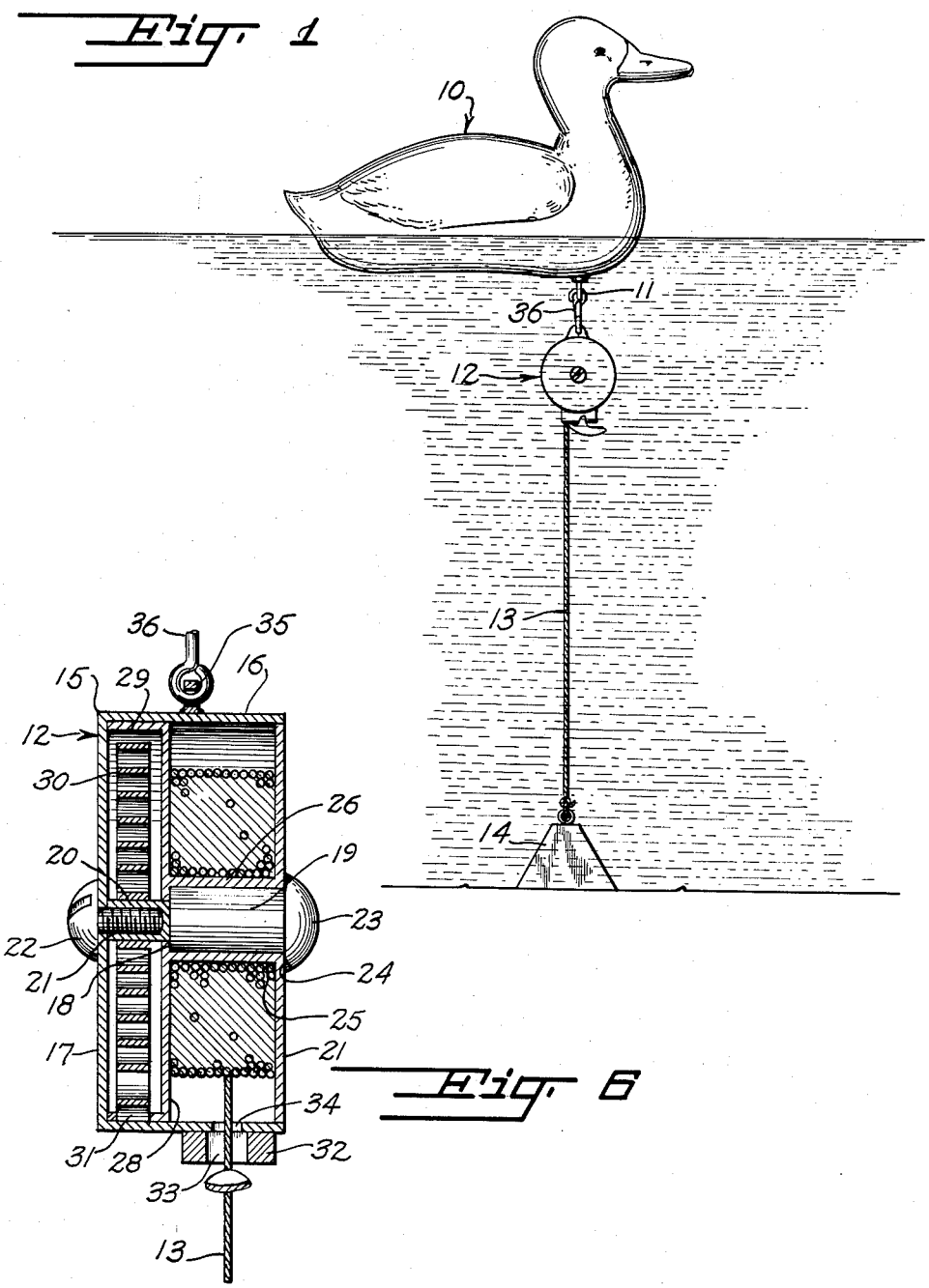
INVENTOR.
Ralph S. Taylor
BY
McMorrow, Berman + Davidson May 29, 1956  R. S. TAYLOR  2,747,814
CORD REEL
Filed Nov. 14, 1952  2 Sheets-Sheet 2
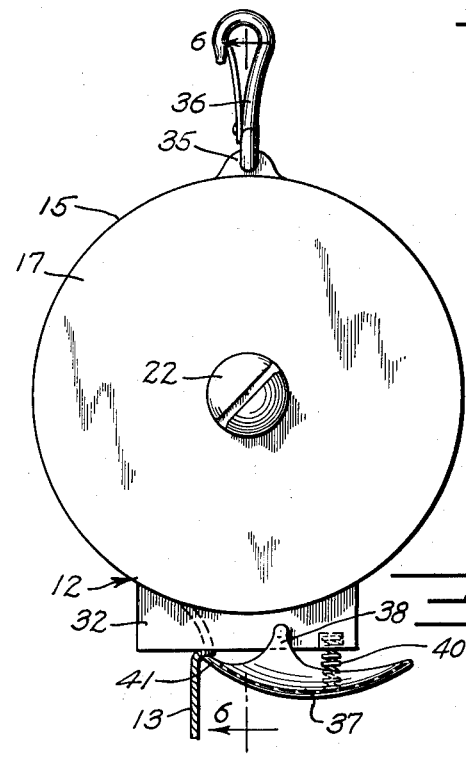
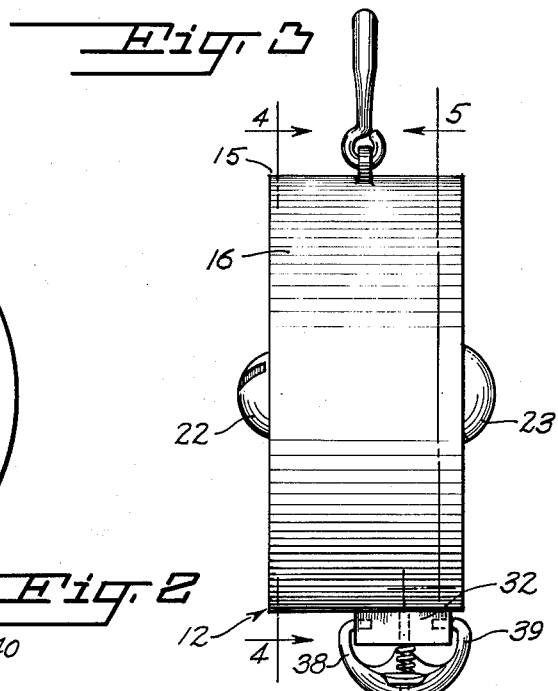
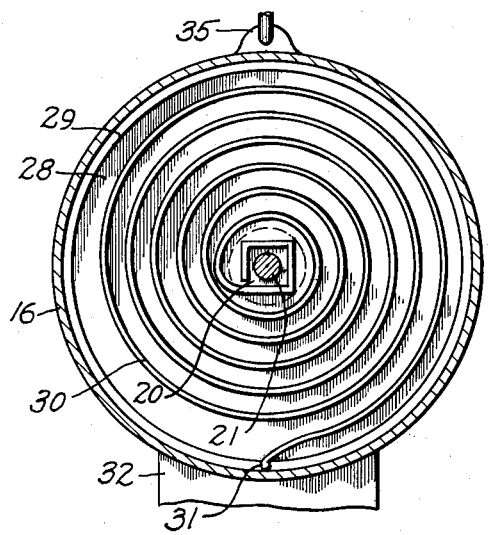
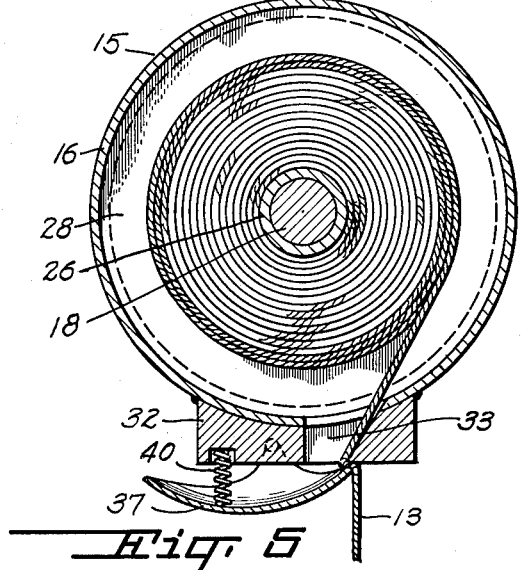
INVENTOR.
Ralph S. Taylor
BY

United States Patent Office 2,747,814
Patented May 29, 1956

2,747,814
CORD REEL
Ralph S. Taylor, Cicero, Ill.

Application November 14, 1952, Serial No. 320,428

1 Claim. (Cl. 242—107)

This invention relates to cord reels and more particularly to an automatic reel for winding a cord used as an anchor line for a duck hunting decoy.

It is among the objects of the invention to provide an improved cord reel which is spring operated to automatically rewind a cord attached thereto and is provided with means for locking the cord with selected lengths of cord extending from the reel; which is easily attachable to a buoyant object, such as a duck decoy, and of such weight as to be readily supported by such an object floating on the water without submerging the article in the water to an undesirable extent; which has means for detachably connecting it to the supporting object, so that the reel and the object can be connected together or separated, as desired; and which is of simple and durable construction, economical to manufacaure, easy to use, and positive and effective in operation.

Other objects and advantages will become apparent from a consideration of the following description and the appended claim in conjunction with the accompanying drawings wherein:

Figure 1 is a somewhat diagrammatic side elevational view showing a cord reel illustrative of the invention in operative association with a duck decoy, a decoy anchor line and a decoy anchor;

Figure 2 is a front elevational view of the cord reel;

Figure 3 is a side elevational view of the cord reel;

Figure 4 is a cross sectional view on the line 4—4 of Figure 3;

Figure 5 is a cross sectional view on the line 5—5 of Figure 3; and

Figure 6 is a cross sectional view on the line 6—6 of Figure 2.

With continued reference to the drawings, the decoy, generally indicated at 10, may be of a form well known to the art comprising a body of buoyant material, such as light weight wood, carved to the shape and size of a wild duck and painted or otherwise decorated to closely simulate a particular species of wild duck. This decoy will float on the water with the greater portion thereof above the water, as illustrated in Figure 1, and is provided on its bottom surface near the front end thereof with an outwardly extending eye 11 which may be provided by the ring-shaped head of an eye bolt, the shank of which is threaded into the material of the decoy.

An anchor cord reel, generally indicated at 12, is detachably connected to the eye 11 on the decoy, an anchor cord 13 is attached at one end to the reel and an anchor 14 is secured to the other or outer end of the anchor cord.

In the use of the device, a length of cord is pulled out of the reel, so that, with the anchor 14 resting on the bottom of a body of water on which the decoy is used, and with the anchor cord 13 disposed substantially vertically, the decoy will be held directly above the anchor and will be submerged in the water to a desired extent only.

The cord reel 12 has a housing 15 which includes an annular wall 16 which is preferably of cylindrical shape and a flat end wall 17 closing one end of the annular wall 16 with the annular wall extending substantially perpendicularly from the peripheral edge of the end wall, the other end of the end wall being open. A shaft or journal pin 18 is disposed in the housing 15 and includes a cylindrical bearing portion 19 extending inwardly from the plane of the open end of the annular wall 16 of the housing to a location spaced from the inner side of the end wall 17 and an extension 20 of reduced diameter extending coaxially of the bearing portion 19 from the inner end of this bearing portion to the inner surface of the end wall 17 of the housing, the extensoin 20 being provided with a coaxial and screw threaded bore 21. A cap screw 22 extends through the central aperture in the end wall 17 of the housing and is threaded into the bore 21 of the shaft extension 20 to secure the shaft 18 at one end to the housing end wall 17 centrally of and substantially perpendicular to the end wall. The shaft extension 20 is preferably of rectangular or square cross sectional shape for a purpose which will presently appear, and a rounded head 23 is provided on the end of the bearing portion 19 remote from the extension 20 and this head projects marginally outwardly of the adjacent end of the bearing portion to provide an annular shoulder 24 extending around the corresponding end of the bearing portion 19.

A cord winding spool 25 is disposed within the housing 15 and comprises a cylindrical core 26 journaled on the bearing portion 19 of the pin 18 and extending from the annular shoulder 24 to the end of the bearing portion 19 adjacent the pin extension 20, an outer disc or flange 27 mounted on the core 26 at the end of the latter adjacent the head 23 of the bearing pin and provided with a central aperture receiving the corresponding end of the core 26. This outer disc 27 is of circular shape and is disposed substantially perpendicular to the longitudinal center line or axis of the core 26 with its peripheral edge substantially in contact with the inner surface of the annular wall 16 of the housing 15 at the open end of the annular wall. A second disc 28 is carried by the core 26 at the end of the core remote from this disc 27 and this inner disc has a central aperture receiving the pin extension 20 and is disposed substantially perpendicular to the longitudinal center line or axis of the core 26. The inner disc 28 has its peripheral edge substantially in contact with the inner surface of the annular wall 16 of the housing, and is spaced from the end wall 17 of the housing a distance substantially equal to the length of the pin extension 20. This inner disc carries a peripheral flange 29 of cylindrical shape disposed within the annular wall 16 of the reel housing and extending from the inner disc 28 substantially to the inner surface of the end wall 17 of the housing. The inner and outer discs or flanges 27 and 28 define a pair of spaced, parallel side walls, the side wall 27 closing the end of the annular wall 16 remote from the end wall 17 while the side wall being spaced from the end wall 17 defines an annular spring receiving space therebetween of approximately the inside diameter of the annular wall 16.

A cord rewinding spring 30 in the form of a spiral clock spring is disposed within the spring-receiving space and has its inner end surrounding and secured to the pin extension 20, the spring being fixedly connected to this extension by reason of the rectangular cross sectional shape of the extension, so that this inner end of the spring is fixed relative to the housing 15. At its outer end the spring is connected to the cylindrical flange 29 by having a hook formation 31 on the outer end of the spring engaged in a slot in the flange 29.

A boss 32 is disposed on the outer side of the annular wall 16 of the housing 15 and is provided with an aperture 33 extending therethrough substantially midway of the distance between the outer disc 27 and the inner disc 28 of the winding spool 25 and registering with an aperture 34 in the housing wall 16. The anchor cord 13 is wound at one end on the spool core 26 between the discs or flanges 27 and 28, as illustrated in Figure 6, and extends out of the housing through the aperture 34 in the annular wall of the housing and through the aperture 33 in the boss 32. The cord is wound on the spool 25 in a direction such that when the cord is pulled outwardly of the housing the spring 30 is wound up and, when the cord is released, unwinding of the spring 30 pulls the cord back into the housing and rewinds it onto the spool 25.

An apertured lug 35 is secured to the outer side of the annular wall 16 of the reel housing at a location diametrically opposite the boss 32 and a snap hook 36 is pivotally connected at one end to the lug 35 and is engageable in the eye 11 carried by the decoy 10 to detachably connect the reel to the decoy.

A sheet metal clip 37 has spaced apart legs 38 and 39 straddling and pivotally connected to the boss 32, so that the clip overlies the end of the boss remote from the reel housing 15. This clip has one end 41 positioned to engage the cord 13 at one side of the aperture 33 in the boss 32 and force the cord outwardly of the outer end of the aperture 33, as illustrated in Figures 2 and 5, to lock the cord against movement into or out of the housing 15. The side of the aperture 33 at which the clip 37 engages the cord 13 is divergently inclined inwardly of the boss relative to the opposite side of the aperture, as illustrated in Figure 5, to provide an edge at the outer end of this side of the aperture 33 to assist the clip in firmly clamping the cord to the boss 32 against movement relative to the boss. A compression spring 40 is disposed between the outer end of the boss 32 and the inner side of the clip 37 at a location spaced from the axis of the pivotal connections between the legs 38 and 39 of the clip and the boss 32 in a direction away from the aperture 33, so that the spring 40 resiliently urges the end 41 of the clip 37 toward the outer end of the boss and into locking engagement with the cord 13. The clip is manually movable against the force of spring 40 to release the cord by finger pressure on the portion of the clip engaged by the spring.

The arrangement of the reel is such that a desired length of the cord 13 can be pulled out of the reel and when the cord is released, it will be locked in such extended position by the locking clip 37. The length of cord pulled out of the reel will be that sufficient to constitute the anchor line, as illustrated in Figure 1, and when sufficient cord has been pulled out of the reel the anchor 14 will be lowered to the bottom of the body of water and the decoy 10 floated on the water immediately above the anchor, the length of the anchor line being adjusted, if necessary, until the decoy floats properly on the water. When it is desired to remove the decoy, the reel is pulled up and detached from the decoy, the anchor is then pulled up and supported above the water and the clip 37 then manually released to permit the spring 30 to wind the extended portion of the anchor cord back into the reel.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A cord reel attachable to a duck decoy for holding a decoy anchor cord comprising a housing having an annular wall and an end wall closing one end of said annular wall, a shaft disposed in said housing substantially perpendicular to said end wall and rigidly secured at one end to said end wall centrally of the latter, a winding spool journaled on said shaft and spaced from said end wall, an apertured boss on said annular wall, said annular wall having an aperture therein registering with the aperture in said boss, a cord wound on said spool and extending through said registering apertures, a cord rewinding spring disposed between said spool and said end wall with one end secured to said shaft and its other end connected to said spool, a releasable fastener secured to said annular wall at a location opposite said apertured boss for detachably connecting said reel to a decoy, a clip pivotally mounted on said apertured boss for movement in an arcuate path into the aperture in said boss and with one end positioned to intercept and engage said cord at the outer end of said boss, and spring means disposed between said boss and said clips resiliently urging said clip into the aperture in said boss and into engagement with said cord to hold the latter against movement into or out of said housing, said clip being manually movable against the force of said spring to free said cord.

References Cited in the file of this patent
UNITED STATES PATENTS

| | | |
|---|---|---|
| 421,133 | Grierson | Feb. 11, 1890 |
| 450,633 | Motter | Apr. 21, 1891 |
| 706,697 | Sims | Aug. 12, 1902 |
| 1,235,219 | Madden | July 31, 1917 |
| 1,545,312 | Dolan | July 7, 1925 |
| 1,789,649 | Gazecki | Jan. 20, 1931 |
| 1,887,173 | Tamarin | Nov. 8, 1932 |
| 2,416,585 | Holub | Feb. 25, 1947 |
| 2,581,260 | Keen | Jan. 1, 1952 |
| 2,589,913 | Wenner | Mar. 18, 1952 |
| 2,597,615 | Brown | May 20, 1952 |
| 2,678,778 | Gibson | May 18, 1954 |